United States Patent
Iwamoto et al.

(10) Patent No.: US 9,187,718 B2
(45) Date of Patent: Nov. 17, 2015

(54) RINSING AGENT, AND METHOD FOR PRODUCTION OF HARD DISK SUBSTRATE

(75) Inventors: Nobuhiro Iwamoto, Yamaguchi (JP); Nobuaki Mukai, Yamaguchi (JP); Kazutaka Arai, Yamaguchi (JP); Ryuji Kotani, Yamaguchi (JP)

(73) Assignees: Toyo Kohan Co., Ltd, Tokyo (JP); Kohan Kogyo Co., Ltd., Yamaguchi (JP)

( * ) Notice: Subject to any disclaimer, the term of this patent is extended or adjusted under 35 U.S.C. 154(b) by 175 days.

(21) Appl. No.: 13/812,271

(22) PCT Filed: Jul. 19, 2011

(86) PCT No.: PCT/JP2011/066366
§ 371 (c)(1),
(2), (4) Date: Jan. 25, 2013

(87) PCT Pub. No.: WO2012/014726
PCT Pub. Date: Feb. 2, 2012

(65) Prior Publication Data
US 2013/0122786 A1 May 16, 2013

(30) Foreign Application Priority Data
Jul. 26, 2010 (JP) .................................. 2010-166840

(51) Int. Cl.
*C09G 1/02* (2006.01)
*B24B 37/04* (2012.01)
(Continued)

(52) U.S. Cl.
CPC ............ *C11D 17/0013* (2013.01); *B24B 37/04* (2013.01); *C09G 1/02* (2013.01);
(Continued)

(58) Field of Classification Search
CPC .............. B24B 1/00; B24B 7/00; B24B 7/04; B24B 37/042; B24B 37/044; C09G 1/02; C09G 1/04

USPC ................. 451/37, 41, 57, 65, 285, 287, 290; 252/79.1, 79.2
See application file for complete search history.

(56) References Cited

U.S. PATENT DOCUMENTS

| 6,022,837 A | 2/2000 | Oowaki |
| 7,780,751 B2 * | 8/2010 | Fujii et al. ........................ 51/309 |

(Continued)

FOREIGN PATENT DOCUMENTS

| EP | 2 237 311 | 10/2010 |
| JP | 62-208869 | 9/1987 |

(Continued)

OTHER PUBLICATIONS

Written Opinion and Search Report from Intellectual Property of Singapore relating to counterpart application No. 2013005152 dated Jul. 10, 2014.

(Continued)

*Primary Examiner* — Eileen Morgan
(74) *Attorney, Agent, or Firm* — McCarter & English

(57) ABSTRACT

Provided are a rinsing agent to produce a hard disk substrate free from remaining abrasive grains as well as a pit defect on the surface thereof and a method for production of a hard disk substrate using such a rinsing agent. A rinsing agent of the present invention is rinsing solution containing colloidal silica as abrasive grains. Letting that the colloidal silica abrasive grains have a concentration C and an average grain size R (C and R are represented in weight % and nm, respectively), the concentration C and the average grain size R of the colloidal silica abrasive grains have a relation matching the following Expression (1):

$$12.2C + 18.2 \qquad (1).$$

1 Claim, 1 Drawing Sheet

(51) Int. Cl.
*B24B 1/00* (2006.01)
*C11D 17/00* (2006.01)
*C11D 7/20* (2006.01)
*C11D 11/00* (2006.01)
*G11B 5/84* (2006.01)
*C11D 3/12* (2006.01)
*C11D 3/14* (2006.01)

(52) U.S. Cl.
CPC ............... *C11D 3/124* (2013.01); *C11D 3/14* (2013.01); *C11D 7/20* (2013.01); *C11D 11/0041* (2013.01); *G11B 5/8404* (2013.01)

(56) References Cited

U.S. PATENT DOCUMENTS

| | | | |
|---|---|---|---|
| 8,404,009 B2* | 3/2013 | Suzuki et al. | 51/307 |
| 2004/0023496 A1 | 2/2004 | Jung et al. | |
| 2005/0032465 A1 | 2/2005 | Fujii et al. | |
| 2007/0149097 A1* | 6/2007 | Fujii et al. | 451/41 |
| 2007/0254562 A1* | 11/2007 | Machida et al. | 451/41 |
| 2010/0092366 A1* | 4/2010 | Kogoi et al. | 423/345 |
| 2010/0130012 A1 | 5/2010 | Schwandner et al. | |
| 2010/0167547 A1 | 7/2010 | Kamimura | |
| 2010/0190413 A1* | 7/2010 | Nishimoto et al. | 451/28 |
| 2010/0243950 A1* | 9/2010 | Harada et al. | 252/79.5 |

FOREIGN PATENT DOCUMENTS

| | | |
|---|---|---|
| JP | 06-177095 | 6/1994 |
| JP | 2003-178430 | 6/2003 |
| JP | 2003-266299 | 9/2003 |
| JP | 2005-63530 | 3/2005 |
| JP | 2006-61995 | 3/2006 |
| JP | 2006-95676 | 4/2006 |
| WO | WO2006/133249 | 12/2006 |
| WO | WO2009/096495 | 8/2009 |

OTHER PUBLICATIONS

Information Offer Form; Japanese Patent Application No. 2010-166840; dated Jan. 27, 2015; Third Party Submitted his opinion and/or information; pp. 1-7; (Partial Summary of Document in English).

Office Action dated Apr. 1, 2015 in co-pending Taiwan Application No. 100126180.

* cited by examiner

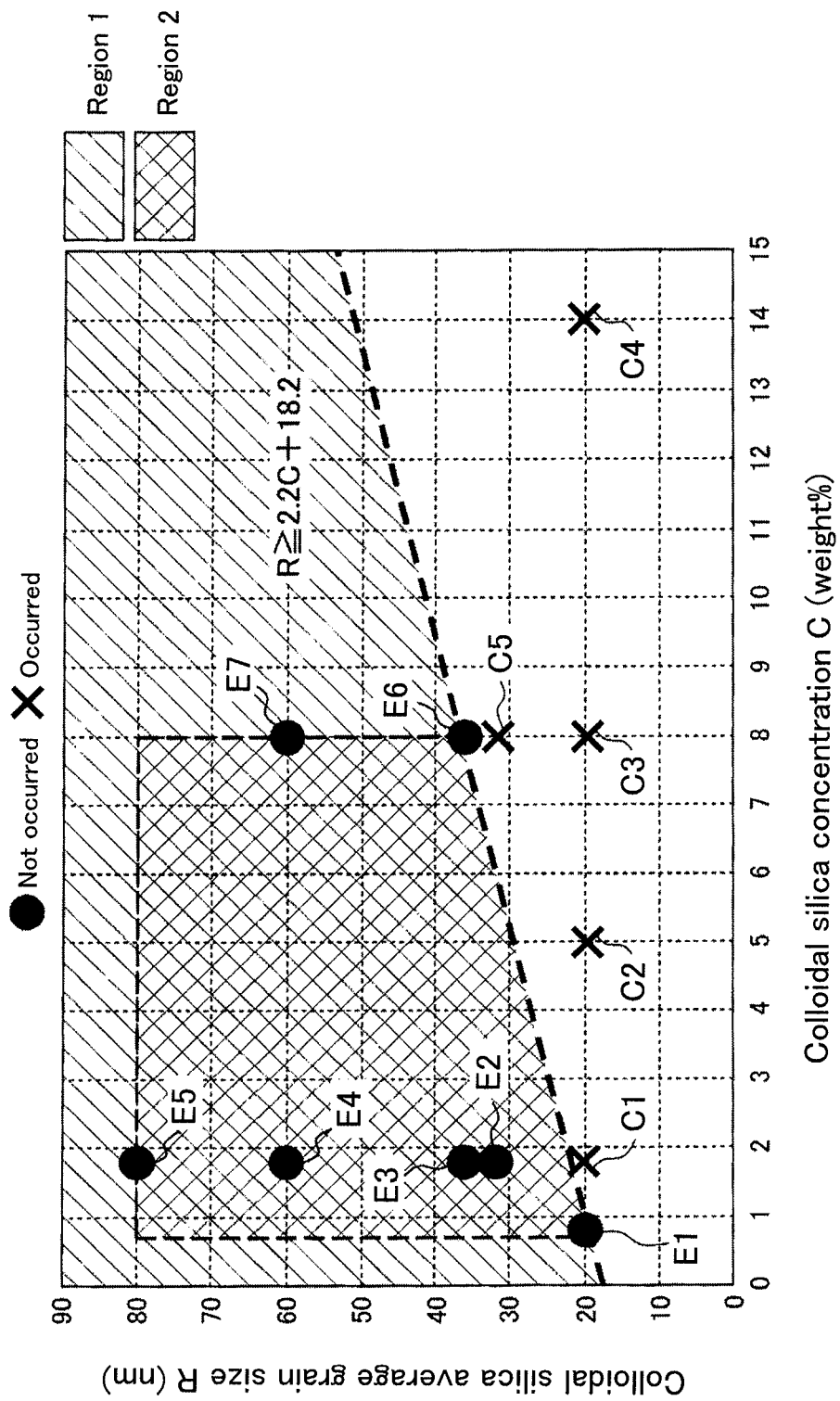

RINSING AGENT, AND METHOD FOR PRODUCTION OF HARD DISK SUBSTRATE

RELATED APPLICATIONS

This application is a national stage application filed under 35 USC 371 of PCT/JP2011/066366, filed Jul. 19, 2011, which claims the benefit of Japanese Patent Application No. 2010-166840, filed Jul. 26, 2010, all of which are incorporated herein, in entirety, by reference.

TECHNICAL FIELD

The present invention relates to a rinsing agent for hard disk substrate and a method for production of a hard disk substrate using such a rinsing agent.

BACKGROUND OF THE INVENTION

Hard disks to be incorporated into magnetic disk storage devices such as a computer have been steadily made more compact and increased in capacity, and so hard disk substrates are required to be of extremely high-precision quality. To this end, the surface of a hard disk substrate is conventionally polished for smoothing, and the process therefor includes rough polishing using alumina abrasive grains and final polishing using colloidal silica abrasive grains.

When such alumina abrasive grains used during the rough polishing are unfortunately left on the substrate surface and they are not removed even after the final polishing, characteristics of the hard disk substrate as a medium may be degraded.

To cope with this, in a known method, rinsing is provided between the rough polishing and the final polishing to rinse a hard disk substrate with rinsing solution containing colloidal silica abrasive grains, thus reducing the remaining alumina on the substrate surface. See JP Patent Publication (Kokai) No. 62-208869 A (1987).

Patent Document 1: JP Patent Publication (Kokai) No. 62-208869 A (1987)

BRIEF SUMMARY OF THE INVENTION

The present inventors, however, found that rinsing with a conventional rinsing agent might cause a pit defect of about tens of nanometers in depth on the substrate surface during rinsing. Therefore an excellent rinsing agent capable of sufficiently removing alumina abrasive grains on the substrate surface without generating a pit defect thereon is demanded.

In view of the above matters, it is an object of the invention to provide a rinsing agent to produce a hard disk substrate free from remaining abrasive grains as well as a pit defect on the surface thereof and to provide a method for production of a hard disk substrate using such a rinsing agent.

In order to cope with the aforementioned problems, a rinsing agent of the present invention contains colloidal silica abrasive grains. Letting that the colloidal silica abrasive grains have a concentration C and an average grain size R (C and R are represented in weight % and nm, respectively), the concentration C and the average grain size R of the colloidal silica abrasive grains have a relation matching the following Expression (1):

$$R \geq 2.2C + 18.2 \tag{1}$$

In the rinsing agent of the present invention, preferably the concentration C of the colloidal silica abrasive grains is from 0.8 to 8.0 weight %, and the average grain size R of the colloidal silica abrasive grains is from 20 to 80 nm.

A method for production of a hard disk substrate of the present invention includes a rinsing step of rinsing a hard disk substrate using the rinsing agent where the relation between the concentration C and the average grain size R of the colloidal silica abrasive grains matches the above Expression (1). The rinsing step is preferably performed after a rough-polishing step and before a final-polishing step, in the rough-polishing step, the hard disk substrate being rough-polished using polishing slurry containing alumina abrasive grains and in the final-polishing step, the hard disk substrate being final-polished using polishing slurry containing colloidal silica abrasive grains.

According to the rinsing agent for hard disk substrate and the method for production of a hard disk substrate using such a rinsing agent of the present invention, rinsing of the surface of a hard disk substrate using the rinsing agent can reduce the amount of remaining alumina abrasive grains on the surface of the hard disk substrate, and so can suppress the occurrence of a pit defect of about tens of nanometers in depth on the substrate surface during rinsing.

BRIEF DESCRIPTION OF THE DRAWINGS

FIG. 1 is a graph showing a result of Table 1.

DETAILED DESCRIPTION OF THE INVENTION

[Method for Production of a Hard Disk Substrate]

A method for production of a hard disk substrate using a rinsing agent of the present invention includes the steps of: grinding an aluminum alloy blank to form a substrate; applying Ni—P plating to the substrate to form a Ni—P layer on the surface of the substrate; rough-polishing the surface of the substrate using polishing slurry containing alumina abrasive grains; rinsing the rough-polished substrate; and final-polishing the substrate using polishing slurry containing colloidal silica abrasive grains.

[Grinding of Aluminum Alloy Blank]

A blank made of aluminum alloy is machined by a lathe at its inner and outer radius end faces, and the surface thereof is ground by grinder processing.

[Ni—P Plating]

A series of processing including etching, zincate treatment, Ni—P plating, pure-water washing, drying and baking is sequentially performed to the substrate.

[Rough Polishing]

After heating the substrate, the Ni—P plated surface of the substrate is rough-polished. The rough-polishing is performed using a lapping plate on which an organic polymer polishing pad is attached, while feeding polishing slurry containing alumina abrasive grains. The polishing slurry used in this process preferably contains, but are not limited to, hydrogen peroxide water, organic acid, inorganic acid and a surface acting agent as typical etchant components.

The alumina abrasive grains preferably have an average grain size of 1 μm or less from the viewpoints to reduce remaining alumina and waviness, and more preferably of 0.7 μm or less. The alumina abrasive grains preferably have the concentration of 10 weight % or less from the viewpoints to improve a polishing rate and of economies, and more preferably of 7 weight % or less.

[Rinsing]

Rinsing is performed using a lapping plate on which an organic polymer polishing pad is attached, while feeding rinsing solution to reduce the alumina abrasive grains on the surface of the hard disk substrate.

The rinsing agent of the present invention used for the rinsing is rinsing solution containing colloidal silica as abrasive grains. Letting that C denotes a concentration of colloidal silica abrasive grains and R denotes an average grain size of colloidal silica abrasive grains (C and R are represented in weight % and nm, respectively), the rinsing agent has a structure where the relation between the concentration C and the average grain size R of colloidal silica abrasive grains matches the following Expression (1):

$$R \geq 2.2C + 18.2 \qquad (1).$$

In this Expression (1), the concentration C of the colloidal silica abrasive grains is preferably in the range of 0.8 to 8.0 weight %, and the average grain size R of the colloidal silica abrasive grains is preferably in the range of 20 to 80 nm.

After rinsing, the substrate may be washed by general scrub washing using ion-exchange water or ultrapure water. From the viewpoint to reduce remaining alumina, a detergent may be used additionally, or ultrasonic DiP may be used additionally. The average grain size may be found by observation with a scanning electron microscope or a transmission electron microscope for image analysis to measure the size of grains.

[Final Polishing]

Final polishing is performed using a lapping plate on which an organic polymer polishing pad is attached, while feeding polishing slurry containing colloidal silica abrasive grains.

The polishing slurry used in this process preferably contains, but are not limited to, hydrogen peroxide water, organic acid, inorganic acid and a surface acting agent as typical etchant components.

The colloidal silica abrasive grains preferably have an average grain size from 5 to 100 nm, and from the viewpoints to reduce surface roughness and waviness and of economies more preferably of 30 nm or less and still more preferably of 20 nm or less. The colloidal silica abrasive grains preferably have the concentration of 20 weight % or less from the viewpoints to improve a polishing rate and reduce scratch and waviness as well as of economies, and more preferably from 2 to 10 weight % or less.

After finish polishing, the substrate may be washed by general scrub washing using ion-exchange water or ultrapure water. From the viewpoints to reduce remaining alumina and remaining colloidal silica, a detergent may be used additionally, or ultrasonic DiP may be used additionally.

The rinsing and the final polishing are the same in that alumina abrasive grains on the surface of a hard disk substrate are reduced by feeding polishing slurry containing colloidal silica a brasive grains. However, since the amount of alumina abrasive grains is reduced on the surface of the hard disk substrate at the rinsing before the final-polishing, a pit defect of about tens of nanometers in depth hardly occurs on the substrate surface.

[Effects from the Present Method]

Rinsing of a hard disk substrate using a rinsing agent of the present invention leads to the effects of reducing the amount of alumina abrasive grains remaining on the surface of the hard disk substrate and so suppressing the occurrence of a pit defect of about tens of nanometers in depth during the rinsing.

This is because, in the case of using a rinsing agent beyond the range of the above Expression (1) about the relation between the concentration C and the average grain size R of the colloidal silica abrasive grains, presumably the colloidal silica abrasive grains aggregate, and such aggregating grains cause pit defects of about tens of nanometers in depth on the surface of the substrate.

[Others]

The rinsing agent of the present invention is suitable for rinsing of a hard disk substrate having a Ni—P layer thereon. The hard disk substrate having a Ni—P layer thereon is not limited especially and may be any well-known one. The substrate for a Ni—P layer may be made of aluminum alloy, glass or carbon, among which a substrate made of aluminum alloy is preferable in general.

EXAMPLES

Rinsing agents were prepared, having the relations of Table 1 between the average grain size R and the concentration C of colloidal silica abrasive grains (Examples 1 to 7 and Comparative Examples 1 to 6).

Herein, as for the average grain size R, the abrasive grains were photographed using a transmission electron microscope (produced by JEOL Ltd., transmission electron microscope, JEM2000FX (200 kV)) in the filed of view of the magnification of one hundred thousand times, and the photo was analyzed for measurement using analysis software (produced by Mountech Co., Ltd., Mac-View Ver. 4.0).

Then, rough-polishing, rinsing using the rinsing agents shown in Table 1, final-polishing and washing were performed in this order to the surfaces of Ni—P plated substrates made of aluminum alloy of 95 mm in diameter, 25 mm in inner diameter and 1.27 mm in thickness, whereby Ni—P plated aluminum alloy substrates to be used for hard disk substrates were obtained.

Conditions for polishing were as follows.

<Settings of Rough Polishing>

Polish testing machine: 9B Double-side polishing machine produced by System Seiko Co., Ltd.

Polishing pad: Polishing pad for P1 produced by FILWEL Co., Ltd.

Feeding rate of slurry: 12 ml/min/pc

Polishing duration: Rough-polishing 150 to 300 sec.

Processing pressure: 100 g/cm$^2$

Substrate input volume: 10 pieces

Rotating speed of lapping plate: 12 rpm to 14 rpm

Polishing slurry composition for rough polishing: alumina abrasive grain size 0.6 μm, concentration 3.9 weight %, containing hydrogen peroxide water, organic acid, sulfuric acid and a surface acting agent as additives.

<Settings of Rinsing>

Polish testing machine: 9B Double-side polishing machine produced by System Seiko Co., Ltd.

Polishing pad: Polishing pad for P1 produced by FILWEL Co., Ltd.

Rinsing duration: 60 sec.

Substrate input volume: 10 pieces

Rotating speed of lapping plate: 12 rpm to 14 rpm

Rinsing agent: prepared in the range of Table 1 for the grain size R and the concentration C of colloidal silica abrasive grains, to which hydrogen peroxide water, sulfuric acid and a surface acting agent were added.

<Settings of Final-Polishing>

Polish testing machine: 9B Double-side polishing machine produced by System Seiko Co., Ltd.

Polishing pad: Polishing pad for P2 produced by FILWEL Co., Ltd.

Feeding rate of slurry: 12 ml/min/pc

Polishing duration: 150 to 300 sec.

Processing pressure: 100 g/cm$^2$

Substrate input volume: 10 pieces

Rotating speed of lapping plate: 13 to 20 rpm

<Washing after Final-Polishing>

The substrate was scrub-washed with ion-exchange water, followed by spin dry.

<Evaluation of Pit Detects>

The substrate surface after drying was observed with OPTIFLAT as an optical surface measurement instrument to check whether a pit defect of about tens of nanometers in depth was present or not.

O . . . Pit defect not occurred

X . . . Pit defect occurred

[Evaluation of Remaining Alumina Abrasive Grains]

The substrates after rinsing were scrub-washed with ion-exchange water, followed by spin dry. Thereafter white spots on the surface substrates were observed with the magnification of 50,000 times using SEM (produced by Hitachi, Ltd. S-4800) to count the number of white spots for evaluation of remaining alumina abrasive grains on the substrate surface.

It is found from the result of Table 1 that pit defects on the substrate surface occurred in a certain condition or did not occur in another condition depending on the relation between the average grain size R and the concentration C of colloidal silica abrasive grains. It is further found that rinsing with a rinsing agent containing colloidal silica abrasive grains after rough-polishing reduced the remaining amount of alumina abrasive grains (pieces/μm$^2$). From these, a rinsing agent having composition matching the above Expression (1) about the relation between the grain size R and the concentration C of colloidal silica abrasive grains contained in the rinsing agent enabled both of reduction in remaining alumina and suppression of pit defects.

TABLE 1

| | Colloidal silica abrasive grain size and concentration in rinsing agents | | | remaining |
| --- | --- | --- | --- | --- |
| | average grain size R (nm) | concentration C (weight %) | occurrence of pit defects | alumina (pieces/μm$^2$) |
| Ex. 1 | 20 | 0.8 | O | 22 |
| Ex. 2 | 32 | 1.8 | O | 34 |
| Ex. 3 | 36 | 1.8 | O | 31 |
| Ex. 4 | 60 | 1.8 | O | 95 |
| Ex. 5 | 80 | 1.8 | O | 123 |
| Ex. 6 | 36 | 8.0 | O | 28 |
| Ex. 7 | 60 | 8.0 | O | 87 |
| Comp. Ex. 1 | 20 | 1.8 | X | 23 |
| Comp. Ex. 2 | 20 | 5.0 | X | 26 |
| Comp. Ex. 3 | 20 | 8.0 | X | 21 |
| Comp. Ex. 4 | 20 | 14.0 | X | 21 |
| Comp. Ex. 5 | 32 | 8.0 | X | 29 |
| Comp. Ex. 6 | without rinsing | | O | 219 |

FIG. 1 is a graph showing the result of above Table 1. In FIG. 1, there were no pit defects on the substrate surface in region S1 above the line connecting two points of a value of Example 1 (E1) and a value of Example 6 (E6) (Examples 1 to 7). As is found, pit defects on the substrate surface occurred in the region below the line connecting the two points of the value of Example 1 (E1) and the value of Example 6 (E6) (Comparative Examples 1 to 5). The region S1 is represented by the above Expression (1).

Then, region S2 of FIG. 1 is defined by a minimum value (E1) and a maximum value (E6, 7) of the concentration C of colloidal silica abrasive grains in Examples 1 to 7 and a minimum value (E1) and a maximum value (E5) of the average grain size R of colloidal silica abrasive grains in Examples 1 to 7. The region S2 is in the range for the concentration C of colloidal silica abrasive grains from 0.8 to 8.0 weight % and in the range for the grain size R of colloidal silica abrasive grains from 20 to 80 nm.

We claim:

1. A method for production of a hard disk substrate having a Ni—P plated layer thereon, comprising:

a rough-polishing step of rough polishing the hard disk substrate using a polishing slurry containing alumina abrasive grains;

a rinsing step of rinsing the hard disk substrate using a rinsing agent comprising colloidal silica abrasive grains and sulfuric acid, wherein the colloidal silica abrasive grains have a weight percent concentration of C and an average nm grain size of R, the concentration C and the average grain size R of the colloidal silica abrasive grains being related according to the following Expression (1):

$$R \geq 2.2C + 18.2 \tag{1}$$

wherein the average grain size R of the colloidal silica abrasive grains is from 20 to 60 nm; and wherein the concentration C of the colloidal silica abrasive grains is from 0.8 to 8.0 weight %; and a final-polishing step of final polishing the hard disk substrate using a polishing slurry containing colloidal silica abrasive grains, wherein the amount of alumina abrasive grains after the final-polishing step is 95 grains/μm$^2$ or less.

* * * * *